UNITED STATES PATENT OFFICE.

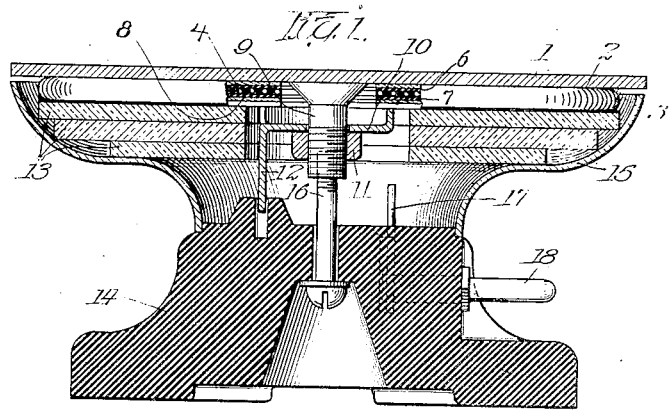

WILLIAM S. HADAWAY, JR., OF NEW ROCHELLE, NEW YORK.

ELECTRIC STOVE.

1,174,030.  Specification of Letters Patent.  Patented Feb. 29, 1916.

Application filed January 28, 1913, Serial No. 744,727. Renewed August 2, 1915. Serial No. 43,344.

*To all whom it may concern:*

Be it known that I, WILLIAM S. HADAWAY, Jr., a citizen of the United States, residing at New Rochelle, in the county of Westchester and State of New York, have invented new and useful Improvements in Electric Stoves, of which the following is a full, clear, concise, and exact description, reference being had to the accompanying drawing, forming a part of this specification.

My invention relates to electric stoves.

One of the objects of the invention is to provide an improved electric stove having a high thermal efficiency.

Another object is to provide an electric stove of simple construction which may be easily manufactured and readily assembled.

Other object and advantages of the invention will hereinafter appear.

In the accompanying drawings I have illustrated a circular stove or disk stove which embodies my invention. The invention is by no means limited to this embodiment, however, but may assume other forms.

Figure 1 is a sectional elevation of the preferred embodiment above mentioned. Fig. 2 is a bottom plan view of the heating disk showing the heating resistance secured thereto, certain parts being broken away to disclose the construction.

The heating plate 1, the upper surface of which constitutes the heat dissipating surface, is shown in the present instance as circular in outline and made of steel. Of course, said plate may have any desired configuration, the preferred contour being one which follows that of the object to be heated,—for example, a coffee-pot or other utensil, whether of circular cross-section or not. To this steel plate or disk 1, a sheet metal carrier 2 is welded in any suitable manner. One satisfactory method is to electrically weld the carrier to the steel plate over large areas, whereby the two are integrally united and a good thermal contact is obtained. Distortion of the heating plate will not impair the thermal efficiency of the connection between the two when they are thus integrally united.

The carrier 2 has a central opening and has an outer marginal flange 3 which, at the time said carrier is welded to said plate, stands out perpendicularly therefrom, but is afterward flanged over as indicated in the drawings. The carrier is provided to support a resistance or heating element 4 in close relation to the plate 1.

The resistance in the present instance consists of a spirally wound resistance wire with an asbestos string 5 interposed between the adjacent turns thereof, although the heating element may assume various other forms. Said heating element is insulated from the carrier 2 by sheet mica 6, preferably in the form of a disk, and is further insulated by a second sheet mica disk 7, arranged on the opposite side thereof. A metallic disk or cover-plate 8 is arranged against said latter mica disk and said cover-plate is secured in place by the flanged over margin 3 of the sheet metal carrier 2.

The parts thus far described are preferably placed in a power press and subjected to great pressure, whereby the flange 3 is very firmly held against the cover-plate 8 and all of the parts are compressed so as to occupy a space of minimum thickness. Thus it will be seen that the resistance is arranged very close to the heating plate 1, and is separated only by the thickness of the sheet metal carrier 2, which is made of good heat-conducting material, and by the mica insulation which is very thin.

In order to further assist in holding the resistance firmly against its carrier or retainer, I provide, preferably at the center of the plate 1, additional securing means welded thereto. Said securing means, in the present instance, has the form of a screw 9, the head of which is located in the center opening in the carrier 2 and is welded to the under side of the plate. A pressure plate or cap 10, in the form of a cup-shaped metallic element, fits loosely over the screw 9 and is secured in place by a nut 11. When the nut is tightened, the flange of said pressure plate 10 bears against the center portion of the cover plate 8 and further insures the holding of the resistance in intimate heat-conducting relation with its carrier 2 and hence with the heating plate 1. The outer end of the screw 9 is provided with a screw-threaded opening, the purpose of which is hereinafter described. The pressure plate 10 is provided with an extension, preferably in the form of an integral downwardly extending lug 12, which fits into an opening in the base and prevents turning of the upper part of the device with respect to the lower part, as hereinafter described.

To prevent downward radiation of heat from the heating element, I provide one or more layers of heat insulating material, preferably in the form of asbestos disks 13, having concentric central openings, as shown in Fig. 1, and having additional openings (see Fig. 2) through which the outer end of the resistance wire passes to one of the two circuit terminals, hereinafter referred to. The inner end of the resistance wire passes down through the center opening, above mentioned, to the other of said terminals.

The stove is provided with a suitable insulating base 14, constructed preferably of molded insulating material. The upper parts of the stove previously described, are carried by said base but are spaced therefrom and held in position by an outer cup-shaped casing 15 which rests on a shoulder at the top of said insulating base and incloses all of the parts heretofore described with the exception of the heating plate. Said base is secured to said upper parts by a single screw 16, which passes upwardly through an opening therein and is received within the previously mentioned screw-threaded opening in the end of the screw 9. It will thus be seen that the parts are very readily assembled or taken apart by manipulating a single screw, and furthermore, both the top and sides of the stove as a whole, are to all appearances entirely free from attaching means or irregular projections, so that a very neat and attractive appearance is presented.

Relative rotation of the upper part with respect to the lower part is prevented by the lug 12, which is received in an opening in the top of the base 14, as clearly shown in Fig. 1. Said base is provided with further openings for the reception of a pair of terminal members 17, with the lower ends of which the terminal pins 18 have screw-threaded engagement. The ends of the coil of resistance wire are secured to the terminal member 17 in any suitable manner. These two ends, as previously stated, are brought down through the center opening and through an outer opening respectively, in the various elements interposed between the heating coil and said terminal members. Some of these openings are shown in Fig. 2, in which a notch or opening 19 in the pressure plate 10 is arranged adjacent to a notch 20 in the cover-plate 8, the latter having a further outer notch 21 for the outer terminal wire. The contact pins 18 provide for connection with an external circuit.

It is to be understood, of course, that the invention is not to be limited to the preferred embodiment herein described and illustrated, nor to the details of said embodiment, as various changes may be made therein without departing from the spirit of the invention as expressed in the appended claims.

What I claim as new and desire to secure by Letters Patent is:

1. In an electric heater, a heating plate, a sheet metal carrier having the same outline as said plate and welded thereto, said carrier having its margin doubled over upon itself and a resistance secured by said doubled-over margin.

2. In an electric heater, a heating plate, a sheet metal carrier having the same outline as said plate and welded thereto, said carrier having its margin doubled over upon itself, a resistance secured by said doubled-over margin, said carrier having a central opening and means welded to said plate independently of said carrier for further securing said resistance.

3. In combination, a metallic disk, a circular resistance carrier welded thereto, said carrier having a central opening, a screw welded by its head to said disk at the center thereof, said carrier having its entire outer periphery flanged inwardly, a resistance held against said carrier by said flanged-over portion, and a pressure plate carried by said screw for assisting in holding the central portions of said resistance against said carrier.

4. A heating device comprising a base, a metallic disk, a heating resistance, a circular sheet-metal carrier inclosing said heating resistance, said carrier being welded to the under surface of said disk, and a casing inclosing said heating element and supporting said disk upon said base.

5. A heating device comprising a base, a metallic disk, a heating resistance, a circular sheet-metal carrier inclosing said heating resistance, said carrier being welded to the under surface of said disk, a casing inclosing said heating element and supporting said disk upon said base, said disk, casing and base being held together by a screw which passes upwardly through said base and is received within a screw-threaded opening in said first screw.

6. A heating device comprising a heating plate, a supporting base, an annular casing resting on said base and supporting said heating plate at a distance above said base, centrally arranged means welded to said plate and secured to said base for holding said plate in position and means carried by said welded means for preventing relative turning of said plate and base.

7. In combination, a metallic heating disk, a sheet metal retaining disk welded thereto, said retaining disk having a central opening, a screw-threaded element welded to the middle of said heating disk, a resistance, a cover plate therefor held to said retainer by the inwardly bent margin thereof, means for insulating said resistance from said retainer and said plate, a cup-shaped element carried by said screw-threaded element and forcing said plate toward said disk, said cup-shaped element having a downwardly extending lug, a supporting base, circuit terminals arranged within openings therein, terminal strips attached to said circuit terminals, and arranged loosely in vertical openings in said base, said resistance being connected in circuit with said terminal strips, an opening in the upper face of said base within which said lug is received to prevent turning of the parts, a centrally arranged screw projecting from said base and received within an opening in said screw-threaded member, a plurality of heat insulating disks arranged beneath said resistance and a casing for holding said insulating disks in position and for properly supporting said heating disk above said base.

In witness whereof, I have hereunto subscribed my name in the presence of two witnesses.

WILLIAM S. HADAWAY, Jr.

Witnesses:
G. P. BROCKWAY,
WM. C. WINTERROTH.